Patented Dec. 1, 1925.

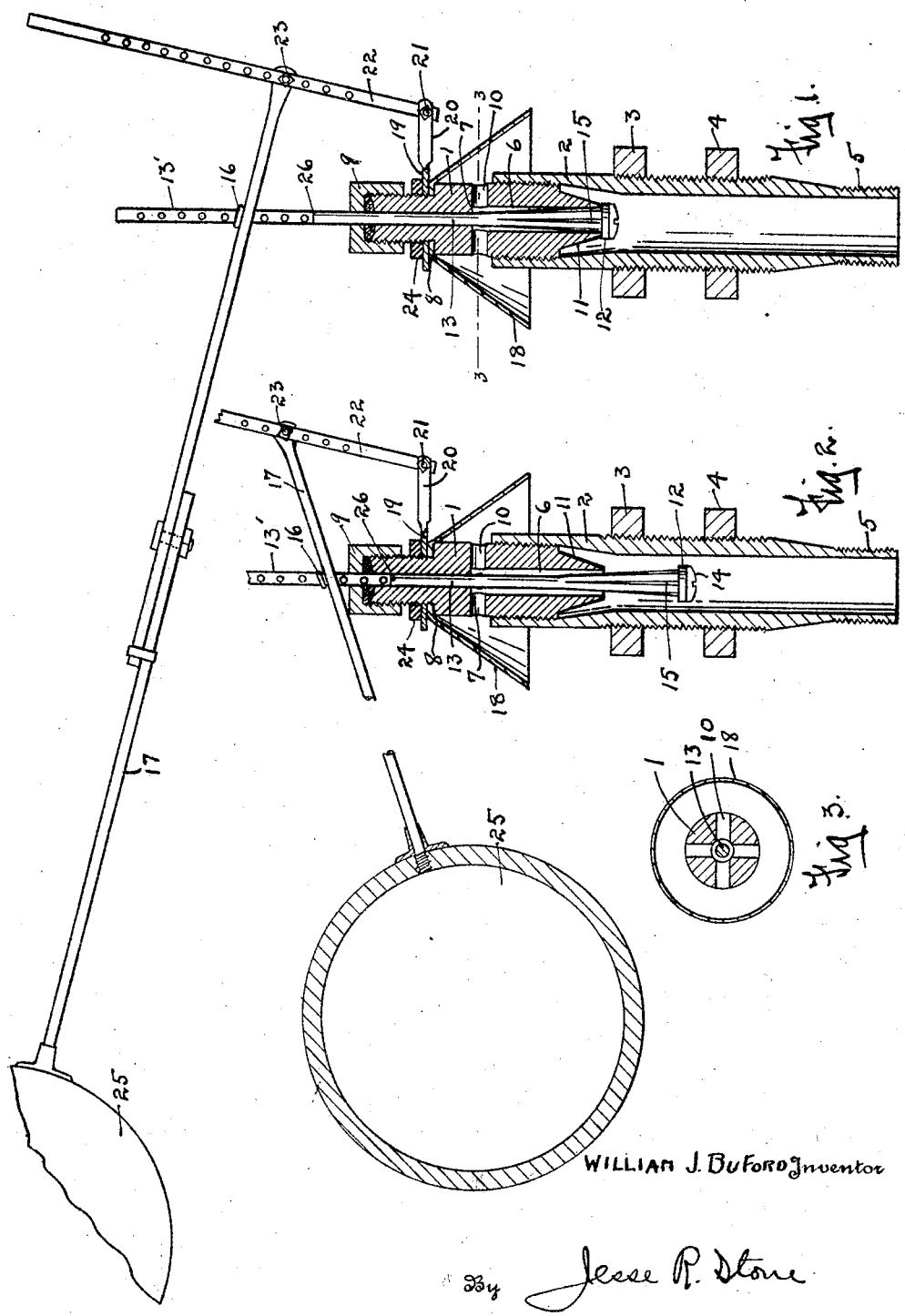

1,563,719

UNITED STATES PATENT OFFICE.

WILLIAM J. BUFORD, OF SAN ANTONIO, TEXAS.

FLOAT-OPERATED VALVE.

Application filed March 7, 1924. Serial No. 697,672.

*To all whom it may concern:*

Be it known that I, WILLIAM J. BUFORD, a citizen of the United States, residing at San Antonio, Texas, have invented a certain new and useful Improvement in Float-Operated Valves, of which the following is a specification.

My invention relates to float operated valves particularly designed for use within the flushing tanks of toilets and the like.

It is an object of my invention to provide a float operated valve which will be practically noiseless in its operation.

It is another object to so construct a valve of the character described that it will be held in closed position by the pressure of the water. It is also contemplated that the valve and its operating means may be readily adjustable for use in different installations without difficulty.

Referring to the drawings herewith, wherein my invention is disclosed, Fig. 1 is a central longitudinal section through a valve embodying my invention. Fig. 2 is a similar view illustrating the parts in a different position. Fig. 3 is a transverse section on the line 3—3 of Fig. 1. Like numerals of reference are employed to designate like parts in all the views.

The body of my valve comprises a plug 1 threaded on its lower end for screwing within the upper end of a short pipe or fitting 2. The fitting is adapted to extend through the bottom of the tank and is threaded on its outer surface to receive clamping nuts 3 and 4 to fit above and below the bottom of the flush tank. The lower end is reduced slightly in diameter and is threaded at 5 to receive a coupling by means of which it may be secured to a pipe leading to a source of water under pressure such as a city water system.

The plug 1 has a central passage 6 therethrough, said passage being reduced in diameter at its upper end, forming a shoulder at 7. The upper end of the plug is reduced in external diameter to provide a shoulder 8 and the upper end is threaded to receive a cap nut 9. A plurality of lateral outlet openings 10 are formed in the plug adjacent the shoulder 7. The lower end of the plug is tapered downwardly at 11, and the tip thereof forms a narrow seat for a valve.

The valve 12 is formed by a cylindrical washer of hard composition or soft metal clamped on the head of the valve stem 13 by means of a set screw 14. The lower end of the valve stem is tapered upwardly and the head thus formed is cut with longitudinal grooves 15 to allow the passage of water as the valve opens.

The valve stem is flattened above the shoulder 26 and is extended above the plug for some distance and perforated at intervals to receive a transverse cotter pin 16 to limit the relative upward movement thereon of a float rod 17.

The plug 1 has clamped thereon above the shoulder 8, a downwardly flaring shield 18 against which the liquid discharged through the openings 10 will impinge, without causing noise or vibration, thus deflecting it downwardly. Above the shield or baffle is a washer 19 clamped against the shield by a nut 24.

The washer 19 has a lateral bracket 20 thereon upon which is fulcrumed at 21 a link 22 having a series of perforations therein to receive a pin 23 by means of which the end of the float rod 17 may be attached for support at various elevations.

The float rod may be made adjustable as to length to provide means for varying the leverage of the float 25 formed on the outer end thereof. The float is preferably made fairly heavy so that it may act also as a weight when the water recedes, and I have shown a spherical float with comparatively thick walls for that purpose.

In the operation of this device there is ordinarily a flush valve in the tank (not shown) to allow the water to empty from the tank. When the water starts to empty from the tank to flush the toilet the valve 12 will be closed and the parts are in the position shown in Fig. 1. As the float 25 drops with the lowering level of the water, the arm 17 will slide down the flattened upper end 13' of the valve rod 13 until the water is nearly exhausted. The rod 17 will then strike shoulder 26, below which the rod is cylindrical, and thus tend to force the valve 12 down off its seat. The first movement of the rod will allow the water to flow in slowly from the pipe 2 through the grooves 15, but as the rod is released it drops down to the position shown in Fig. 2 leaving sufficient opening to force a stream of water upwardly past the valve stem and through the openings 10 to the tank. The flush valve will be closed by this time and the tank will slowly fill up.

The rising water will raise the float valve closing the valve gradually, the arm 17 contacting with the cotter pin 16 on the valve rod. When the valve nears its seat the water pressure below will force it suddenly onto its seat so that it will be closed tightly preventing leakage. The water pressure from below will be greater than that in the tank, thus holding the valve in place until the water level is lowered to allow the float rod 17 to rest on the shoulder 26 of said valve rod.

The operation of the device is simple and quiet and will not be affected by variations in water pressure. It is adjustable to adapt it for operation with small or large quantities of water and under varying loads.

While I have shown one embodiment of my invention it is clear that various modifications and changes may be made without departing from the spirit of my invention.

What I claim as new and desire to protect by Letters Patent is:

1. A valve of the character described including a plug having a central passage therethrough, and lateral outlets from said passage intermediate the ends thereof, an upwardly tapered valve stem slidable in said passage, there being longitudinal grooves in said valve stem, a valve head thereon adapted to close the lower end of said passage, a shield adjacent said outlets to deflect water issuing therefrom, a float and means comprising a rod connecting said float to said valve stem to open and close said valve, said means allowing play of said valve stem relative to said rod whereby said valve may seat abruptly in its final closing.

2. In a float valve of the character described, a tubular fitting forming a valve chamber, a plug screwed within the upper end of said fitting, said plug having radial openings therein and a passage leading from said fitting to said openings, a valve stem in said plug the lower end of which forms an upwardly tapered head, there being upwardly tapered grooves in said head, a valve on said head and float operated means to open and close said valve.

3. In a float valve of the character described, a fitting forming a valve chamber, a plug in the upper end of said fitting, said plug having a central passage and lateral outlets leading from said passage, a valve stem extending through said plug, a longitudinally grooved tapered head on the stem, a valve on said head, a float operated arm connected with said valve stem to open and close said valve, there being limited play between said arm and said valve stem allowing said valve to close abruptly in its final closing.

In testimony whereof I hereunto affix my signature this 1st day of March, A. D. 1924.

WILLIAM J. BUFORD.